United States Patent

[11] 3,584,157

[72] Inventor Robert E. Prescott
Rumson, N.J.
[21] Appl. No. 743,195
[22] Filed July 8, 1968
[45] Patented June 8, 1971
[73] Assignee Bell Telephone Laboratories Incorporated
Murray Hill, Berkeley Heights, N.J.

[54] INTERCHANGEABLE TELEPHONE HANDSET CORD PLUG AND CORD REEL

4 Claims, 6 Drawing Figs.

[52] U.S. Cl. .......... 179/100D, 179/155
[51] Int. Cl. .......... H04m 1/02, H04m 1/15
[50] Field of Search .......... 179/100, 100 D, 103, 1 P&C, 155, 178, 179; 339/39, 75 P, 2 R, 5 R, 6 R, 8 R, 123, 135, 119, 75

[56] References Cited

UNITED STATES PATENTS

| | | | |
|---|---|---|---|
| 2,007,699 | 7/1935 | Wiebking .......... | 339/5 R |
| 3,056,863 | 10/1962 | Johnson .......... | 339/5 R |
| 2,535,031 | 12/1950 | Beatty .......... | 339/39 |
| 3,003,018 | 10/1961 | Cook .......... | 179/155 |
| 3,444,329 | 5/1969 | Krumreich .......... | 179/100 |

*Primary Examiner*—William C. Cooper
*Assistant Examiner*—Randall P. Myers
*Attorneys*—R. J. Guenther and Edwin B. Cave

ABSTRACT: Interchangeability between a telephone handset cord plug and a cord reel is realized in a set whose base includes an exterior cavity to accommodate either element. The base plate when in position also locks the element in its cavity.

INVENTOR
R. E. PRESCOTT
BY Charles E. Graves
ATTORNEY

INTERCHANGEABLE TELEPHONE HANDSET CORD PLUG AND CORD REEL

FIELD OF THE INVENTION

This invention concerns telephone sets of the type designed to accommodate a cord reel.

BACKGROUND OF THE INVENTION

In the telephone art, cord reels are one method for managing the long lengths of station cord that connect the handset with the telephone base. Their use is mainly in connection with desk-type phones. The typical cord reel consists of a drum and frame for spooling the station cord, and flat-coil springs which function both as return springs and flexible electrical leads. In practice, this is a bulky assembly requiring a significant portion of the interior volume of the telephone base for its housing.

While not a serious problem in respect to more conventional telephones with massive bases, the space needs of cord reels is of critical concern to the compact modern telephones of the type shown, for example, in design patent U.S. Pat. No. D202,787, and more recently in R. E. Prescott et al. U.S. Pat. application Ser. No. 722,426 filed Apr. 18, 1968. Heretofore, cord reels have occupied excess space in the base interior volume and their presence or absence was largely immaterial in arranging the other components such as ringer, switchhook, network and dial within the base. Now, however, with space at a premium in a base drastically reduced in size, placement of the cord reel in a noninterfering yet accessible location requires a certain finesse.

Moreover, in keeping with the emerging philosophy of greater flexibility of choice for telephone customers, and its speedy implementation, new cord reels should be interchangeable with conventional cord plugs by the subscriber himself. This, too, goes to the matter of reel accessibility; but the current practice of locating the reel within the base interior behind a baseplate requires more mechanical skill than can be expected of the average subscriber.

At the same time, if the interchangeability just mentioned is to be realized, both cord reel and plug should make like contributions to the weighting of this relatively smaller base in order to assure its stability. But because of the great size disparity between these elements, the equalizing of their weighting effects presents a further problem.

Accordingly, one object of this invention is to effect a truly accessible mounting of the cord reel in a telephone base.

Another object of this invention is to mount a cord reel in a telephone base with little or no interference with any other components in the base.

A further object of this invention is to achieve for a given telephone set interchangeability between a station cord reel and its alternative, the station cord plug, insofar as their mounting is concerned.

A further object of this invention is to equalize the weighting effects of a station cord plug and a cord reel when installed in a telephone base.

A further object of this invention is to make interchangeable station cord plugs and cord reels equally accessible to a telephone subscriber.

SUMMARY OF THE INVENTION

In its broadest terms, the invention contemplates the housing of a cord reel entirely within an exterior receptacle or cavity whose entrance is through the base bottom. Electrical connection with the components in the base interior is afforded through contacts contained in the cavity. The cavity floor and walls snugly accommodate a cord reel and, alternatively, a like-shaped station cord plug also adapted to connect electrically with the cavity contacts.

In one embodiment, the reel-plug cavity is molded into one end of the base bottom exterior, and includes a pronounced end taper for leading the reel cord between the flush-mounted feet of the base and to the base bottom periphery. Both reel and plug are of the same height, chosen to bring their bottom surfaces flush with the planar base bottom when installed. Each is locked in the cavity by the same means which in one embodiment is a readily removable base plate contacting the entire base bottom surface.

Thus, removal of either the plug or the reel involves merely the removal of the securing base plate. No further locking is necessary since, owing to the snug fit of each in the cavity, the items are firmly held by the thrust of the baseplate and simply fall out on removal of the baseplate.

Of further advantage in the practice of the present invention is the technique, contained in the aforementioned application Ser. No. 722,426, of securing the baseplate itself by means of rotatably-mounted feet. This expedient allows removal of the baseplate, and hence the plug or reel, merely by rotating the four corner feet, an operation well within reach of most phone users. Other equally effective methods of detachable securing the baseplate, or the plug or reel directly, are readily envisionable.

One feature of the invention, accordingly, involves an exterior cavity molded into a telephone base bottom for receiving either a cord reel or a like-shaped plug.

A further feature of the invention is the securing of either the cord reel or the plug with the same mechanism to allow for their interchanging.

A greater understanding of the invention and its further objects, features and advantages will be gained from a reading of the description of an illustrative embodiment which follows.

THE DRAWING

Figure 1:
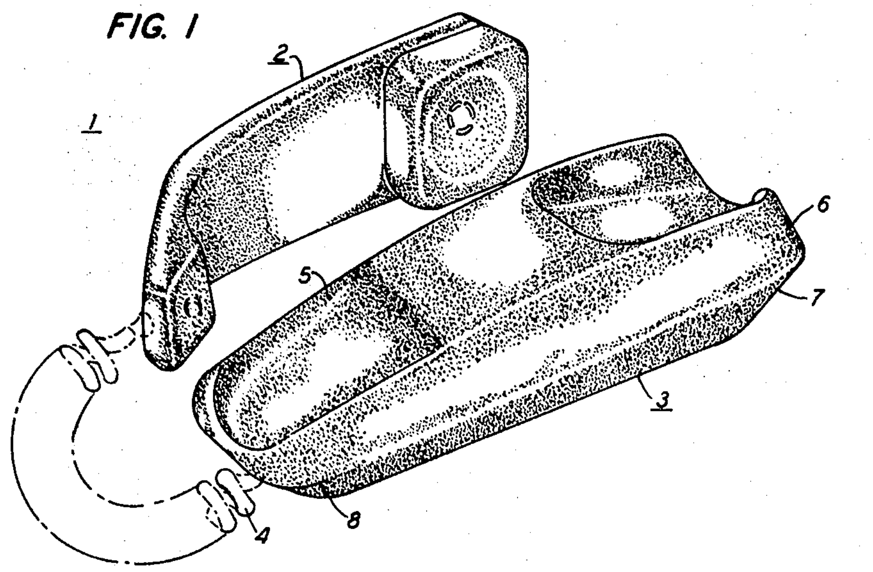
FIG. 1 is a perspective view of an illustrative telephone handset and base in which the invention is practiced.

The invention is illustrated by way of its application to the telephone set shown in FIG. 1 and designated with the numeral 1, which is substantially the same set described in the aforementioned application Ser. No. 722,426 and assigned to applicant's assignee. It is to be understood, however, that the invention is broadly applicable to any telephone set consisting of a base and a separate handset.

Telephone set 1 consists of a handset 2 and a base 3 electrically connected through a station cord 4, with the base upper surface constituting a cradle 5 for the handset. The base housing consists of an upper shell 6 and a lower shell 7 matably disposed along a mating edge 8.

Figure 2:
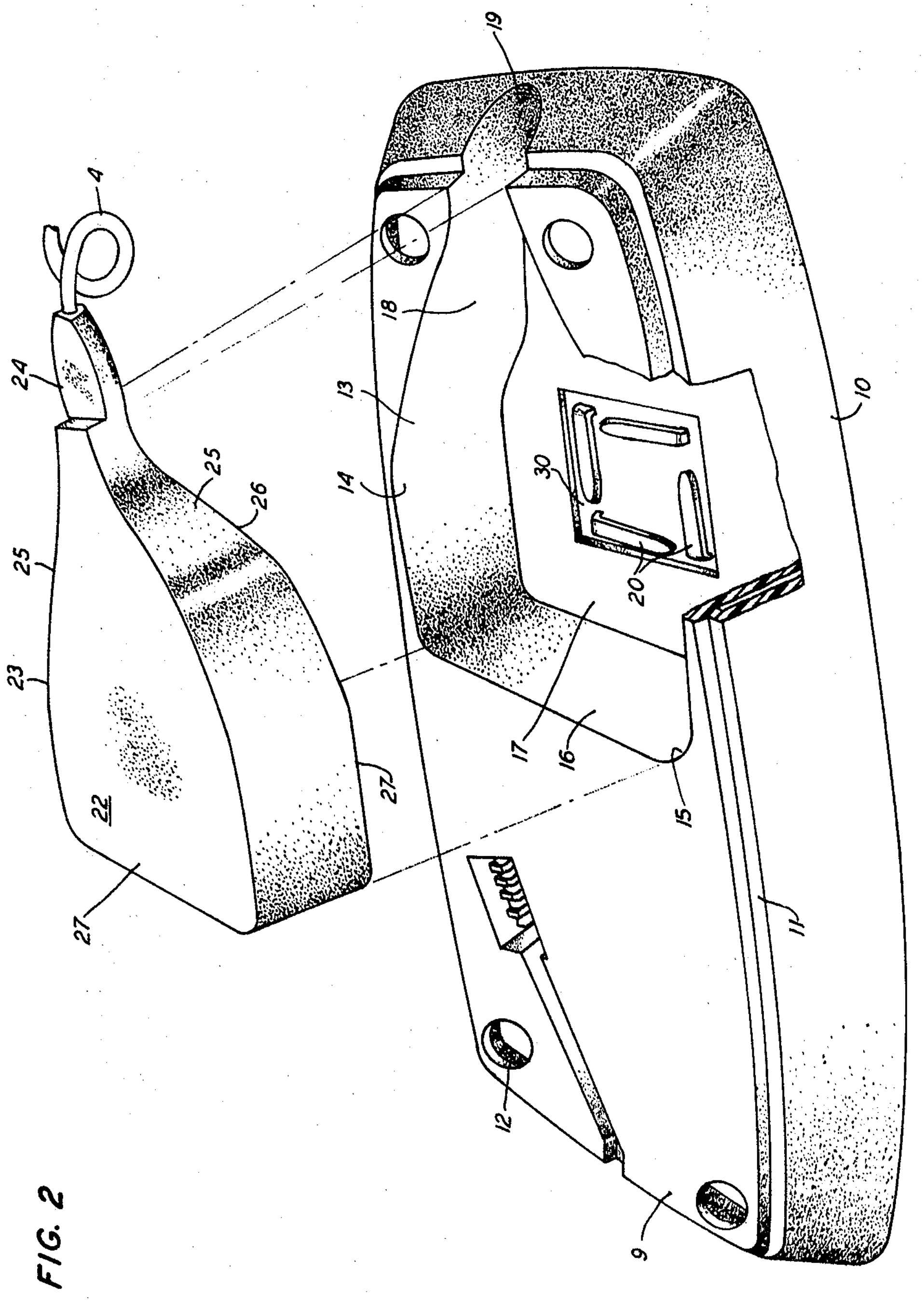
FIG. 2 is a bottom perspective view in partial cutaway, showing the exterior cavity and a like-shaped element which fits therein.

As seen in FIG. 2, lower shell 7 includes a bottom surface 9 which is planar and slightly inset from the sidewall 10 to form a shoulder 11. The hole 12 is one of four corner holes which receive feet such as 39, in a manner to be described. Advantageously, both upper and lower shells 6, 7 are molded plastic and relatively thin walled, whose construction and interior components are substantially described in applicant's patent application Ser. No. 700,521, filed Jan. 25, 1968.

Pursuant to one aspect of the invention, the lower shell 7 includes an exterior receptacle or cavity 13 which advantageously is located at one end of lower shell 7 and is molded integrally therewith. Cavity 13 consists of two sidewalls 14, 15, and end wall 16 and a floor 17. The width of cavity 13, as suggested by the extent of end wall 16, is only slightly less than the width of bottom surface 9 itself, thus creating a rather substantial receptacle. Floor 17 includes a tapered section 18 which terminates in an entrance 19 through one end of the lower shell 7. The metal spring contacts 20 connect to interior components (not shown) of the base 3 through a substrate 30 which is shown in FIG. 3.

Figure 3:
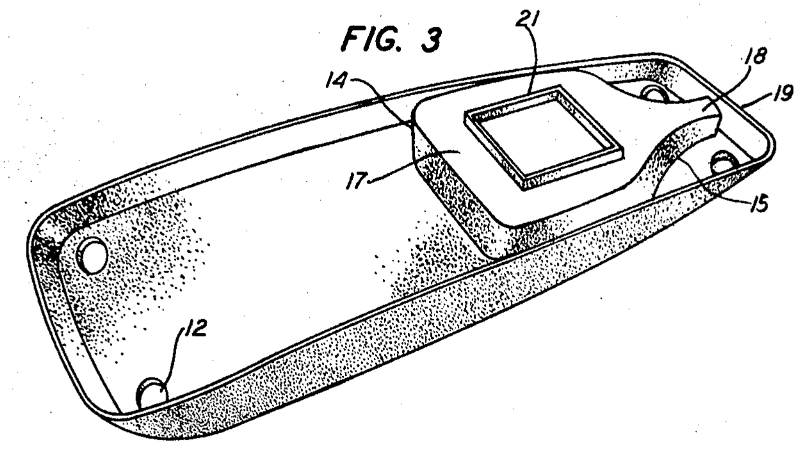
FIG. 3 is a top perspective view of the base bottom molding.

Also shown in FIG. 3 is the interior side of lower shell 7, in particular, the molded side and end walls, the floor and the tapered shell, these being designated with their numerals 14 through 19. Channel 18 narrows sufficiently to clear the foot-mounting holes 12. The shape and location of cavity 13 is not of critical importance in the practice of the invention. It is necessary, however, that a relatively large bulk can be accommodated in cavity 13, substantially larger than heretofore used in the connecting of a station cord to a telephone base.

The element to be received in cavity 13 and designated 22, comprises in accordance with the invention a bulk of substantially the same shape as cavity 13. In the present illustration, element 22 consists of a body 23, a cord lead-in fixture 24, tapered sidewalls 25, a contacting surface 26 which tapers upwardly, and opposite surface 26 a flat bottom 27. Element 22 is the mass equivalent of the void which comprises cavity 13, but—importantly—element 22 is dimensioned so as to perfect a clearance fit in cavity 13. Thus, while substantially no play is permitted between element 22 and cavity 13, element 22 nonetheless will fall from cavity 13 of its own weight if subjected to gravitational force.

Figure 5:
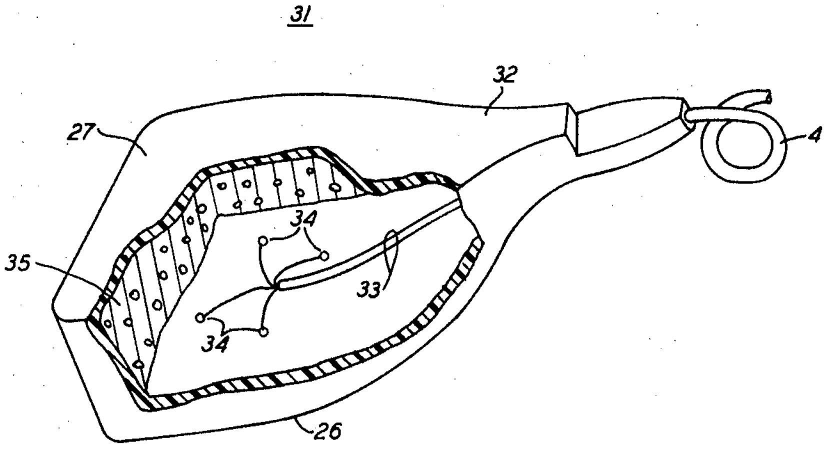
FIG. 5 is a cord plug.
Figure 6:
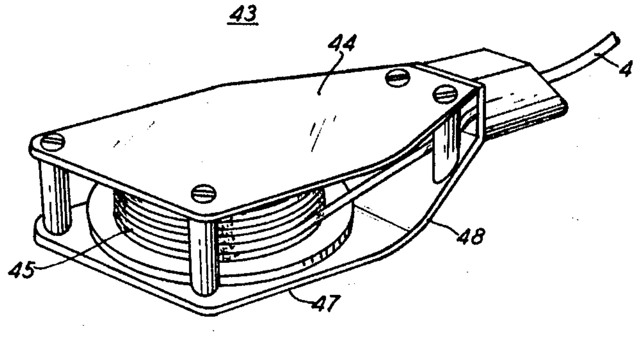
FIG. 6 is a like-shaped cord reel.

Element 22 represents the generalized form of a station cord plug 31 seen in FIG. 5 as well as of a cord reel 43 seen in FIG. 6. Advantageously, the width of element 22 between the surfaces 26 and 27 is such that, when installed in cavity 13, its bottom 27 is coplanar with the bottom surface 9 of lower shell 7.

FIG. 5 shows a station cord plug 31 in the shape of element 22 and consisting of molded shell 32, with a plurality of conductors 33 leading from station cord 4 to a like number of contacts 34 suitably mounted into contact surface 26. Contacts 34 effect electrical connection with the spring contacts 20 which are mounted, for example, in a substrate such as 30 occupying a flanged shoulder 21 molded into floor 17.

FIG. 6 depicts a cord reel adapted to the shape chosen for the practice of the instant invention. Typically cord reel 43 consists of a frame assembly 44 which mounts a spring-loaded drum 45. Contacts (not shown) on the underside of reel 43 effect electrical connections to the spring contact 20 in the cavity 13 when the cord reel is in place therein. As with station cord plug 31, the height of the cord reel 43 should be such that brings its bottom 47 into planar relation with surface 9 of lower shell 7. The bottom 47 includes an upward bend 48 which conforms to the contour of contacting surface 26.

The components of cord reel 43 particularly frame 44 are sufficiently heavy to impart a desirable amount of added weight to base 3, a normally necessary expedient in view of the tendency of such bases to slide when in use on a flat surface. Similarly, pursuant to a prime aspect of the invention, the station cord plug 31 when used with base 3 imparts a like amount of added weight thereto by virtue of its sheer bulk. Advantageously, this bulk is achieved by filling the unoccupied interior of plug 31 with a composite such as, for example, graded gravel and polyurethane foam, designated 35, in accordance with the principles and practices advanced in the aforementioned U.S. Pat. application Ser. No. 700,521.

Figure 4:
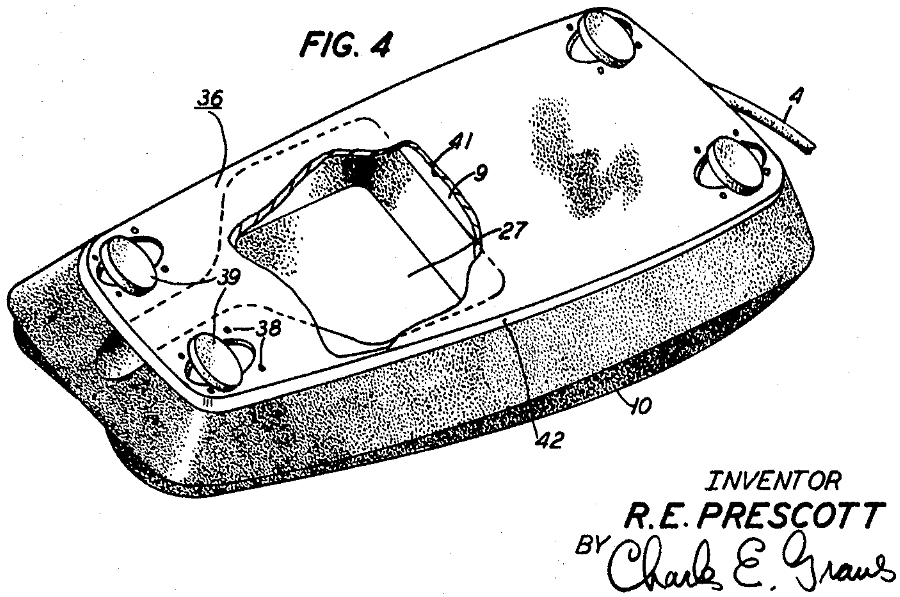
FIG. 4 is a bottom perspective view of the base in partial cutaway.

The practice of the instant invention calls for the detachable securing of whichever element—cord plug 31 or cord reel 43—is to be used in a given base. One way of achieving this feature is shown in FIG. 4 and involves the use of a baseplate 36 such as disclosed in the aforementioned U.S. Pat. application Ser. No. 722,426. Baseplate 36 is secured by feet 39 whose faces are oval and which include a flanged portion (not shown) that engages through the hole 12 and onto the underside of surface 9.

The breakout of FIG. 3 shows that the interior surface 41 of baseplate 36 is in communication with the bottom planar surface 9 as well as with the bottom 27 of the element 22 which, it will be recalled, represents the interchangeable cord plug 31 and cord reel 43. Advantageously, baseplate 36 also includes a flange 42 which fits snugly around the shoulder 11 of lower shell 7.

In the present embodiment, baseplate 36 is readily secured to the bottom surface 9 by placing it over the oval feet 39 and then twisting these feet 90°, thus securing both the baseplate 36 and the station cord plug 31, or, alternatively, the cord reel 43. It is apparent that this operation may be readily achieved by an unskilled person without use of tools or alternately by using a coin inserted in the slot provided for that purpose. Similarly, removal of the baseplate 36 and the element 22 is achieved by rotating the feet 39, allowing baseplate 36 to come loose. When this occurs, the station cord plug or the cord reel will fall from the base of its own weight.

Other means of securing the cord plug or cord reel within the receiving cavity 13 can be readily envisioned, all such methods of course being within the purview of the present teaching.

It is to be understood that the embodiments described herein are merely illustrative of the principles of the invention. Various modifications may be made thereto by persons skilled in the art without departing from the spirit and scope of the invention.

What I claim is:

1. A telephone set adapted to interchangeably receive a station cord reel plug or a station cord plug with equivalent weighting effect, comprising a telephone base comprising an upper and a lower shell, said lower shell comprising a bottom surface, end portions, and an interior volume;

a single substantially closed exterior cavity extending inwardly of, and accessible from, said base bottom surface, said cavity defined by a floor and interior walls separating same from the base interior volume; said cavity being located at one end of said base and having a width only slightly less than the adjacent base bottom surface; said floor tapering upwardly and terminating in an entrance through a one of said end portions, said interior walls tapering inwardly toward said entrance; an electrical connector element having substantially the same shape as said cavity and disposed therein in a clearance fit, said element being of a height which, when fully installed in said cavity, brings the bottom surface of said element into substantially coplanar relation with said base bottom surface, and means for releasably confining said element within said cavity.

2. A telephone set in accordance with claim 1, wherein the interior volume of said station cord plug is filled with a weighting material.

3. A telephone set in accordance with claim 2, wherein said weighting material is a gravel-polyurethane foam mixture.

4. A telephone set in accordance with claim 1, wherein said element comprises a cord reel plug.